United States Patent
Jang et al.

(10) Patent No.: US 9,429,804 B2
(45) Date of Patent: Aug. 30, 2016

(54) DISPLAY DEVICE AND MANUFACTURING METHOD THEREOF

(71) Applicant: Samsung Display Co., Ltd., Yongin (KR)

(72) Inventors: Eun Je Jang, Hwaseong-si (KR); Sung In Ro, Hwaseong-si (KR); Ock Soo Son, Seoul (KR); Hyun Wuk Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/103,472

(22) Filed: Dec. 11, 2013

(65) Prior Publication Data

US 2015/0021630 A1    Jan. 22, 2015

(30) Foreign Application Priority Data

Jul. 16, 2013    (KR) .................. 10-2013-0083694

(51) Int. Cl.
*H01L 29/18*    (2006.01)
*G02F 1/1362*    (2006.01)

(52) U.S. Cl.
CPC .............. *G02F 1/136227* (2013.01)

(58) Field of Classification Search
CPC .............. H01L 27/124; H01L 29/78633
USPC ........................................ 257/88
See application file for complete search history.

(56) References Cited

U.S. PATENT DOCUMENTS

| 6,778,232 B2 | 8/2004 | Nakata et al. |
| 8,085,366 B2 | 12/2011 | Chang |
| 8,330,916 B2 * | 12/2012 | Lee et al. ............. G02F 1/1368 349/139 |
| 2010/0019246 A1 * | 1/2010 | Kim et al. ........ H01L 29/78633 257/72 |
| 2010/0163862 A1 * | 7/2010 | Yang et al. .................... 257/43 |
| 2011/0063557 A1 * | 3/2011 | Kim et al. .................. 349/141 |

FOREIGN PATENT DOCUMENTS

| JP | 2010-139600 | 6/2010 |
| KR | 10-2000-0060830 | 10/2000 |
| KR | 10-0749458 | 8/2007 |
| KR | 10-2010-0033710 | 3/2010 |

* cited by examiner

*Primary Examiner* — Trung Q Dang
*Assistant Examiner* — Patricia Reddington
(74) *Attorney, Agent, or Firm* — H.C. Park & Associates, PLC

(57) ABSTRACT

The present invention relates to a display device, and a manufacturing method thereof. The display device includes a first insulation substrate; gate lines and data lines positioned on the first insulating substrate. The gate lines and data lines are insulated from each other and crossed each other. A first passivation layer positioned on the gate lines and the data lines, and including a first contact opening. A color filter positioned on the first passivation layer, and including an opening. An organic insulation layer positioned on the color filter, and including a contact hole, in which the first contact opening is larger than the opening. The organic insulation layer covers the color filter and the contact opening.

8 Claims, 17 Drawing Sheets

DISPLAY DEVICE AND MANUFACTURING METHOD THEREOF

CROSS-REFERENCE TO RELATED APPLICATION

This application claims priority to and the benefit of Korean Patent Application No. 10-2013-0083694 filed on Jul. 16, 2013, which is hereby incorporated by reference for all purposes as if fully set forth herein.

BACKGROUND

1. Technical Field

Exemplary embodiments of the present invention relate to a display device and a manufacturing method thereof.

2. Description of the Background

A flat panel display may be used as a display device, and various displays, such as a liquid crystal display, an organic light emitting diode display, a plasma display device, an electrophoretic display, and an electrowetting display device, may be used as the flat panel display.

A liquid crystal display, which is one of the most widely used flat panel displays, may include two display panels on which electric field generating electrode, such as a pixel electrode and a common electrode, may be formed, and a liquid crystal layer inserted therebetween. Typically, the liquid crystal display displays an image by generating an electric field on a liquid crystal layer by applying a voltage to the electric field generating electrodes, and alignments of liquid crystal molecules of the liquid crystal layer are determined through the electric field, and controlling polarization of incident light.

In the liquid crystal display, both of the two electric field generating electrodes generating an electric field on the liquid crystal layer may be formed on a thin film transistor display panel.

In a case where the two electric field generating electrodes are formed on the thin film transistor display panel, a plurality of insulation layers may be disposed between the thin film transistor and the electric field generating electrode, and at least one layer of the plurality of insulation layers may be used as an organic insulation layer. Contact openings for electrically connecting the thin film transistor and the electric field generating electrode may be formed on the plurality of insulation layers.

When the contact openings are formed on the plurality of insulation layers, an undercut may be generated by an etching process of the insulation layer. A shape of the undercut may cause a disconnection, thereby causing a defect of the display.

The above information disclosed in this Background section is only to set up Applicant's recognition of problems within existing art and merely for enhancement of understanding of the background of the invention based on the identified source of problems, and therefore the above information cannot be used as prior art in determining obviousness into the present invention.

SUMMARY

Exemplary embodiments of the present invention provide a display device, in which an organic insulation layer covers an undercut portion, so that a generation of a disconnection due to an undercut is prevented, and a contact hole of an organic insulation layer is smaller than a predetermined contact hole of a passivation layer, and a manufacturing method thereof.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a display device. The device includes a substrate. The device includes gate lines and data lines that are disposed on the substrate. The device includes a passivation layer disposed on the gate lines and the data lines. The passivation layer including a contact opening. The device includes a color filter disposed on the first passivation layer. The color filter includes an opening. The device also includes an organic insulation layer disposed on the color filter. The organic insulation layer includes a contact hole. The contact opening is larger than the opening in the color filter, and the organic insulation layer covers the color filter and the contact opening.

Exemplary embodiments of the present invention disclose a method of manufacturing a display device. The method includes forming gate lines and data lines on a substrate. The method includes forming a passivation layer on the gate lines and the data lines. The method includes forming a color filter on the passivation layer, the color filter comprising an opening. The method includes forming a contact opening by etching the passivation layer by using the color filter as a mask. The method also includes disposing an organic insulation layer on the color filter, the organic insulation layer including a contact hole.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
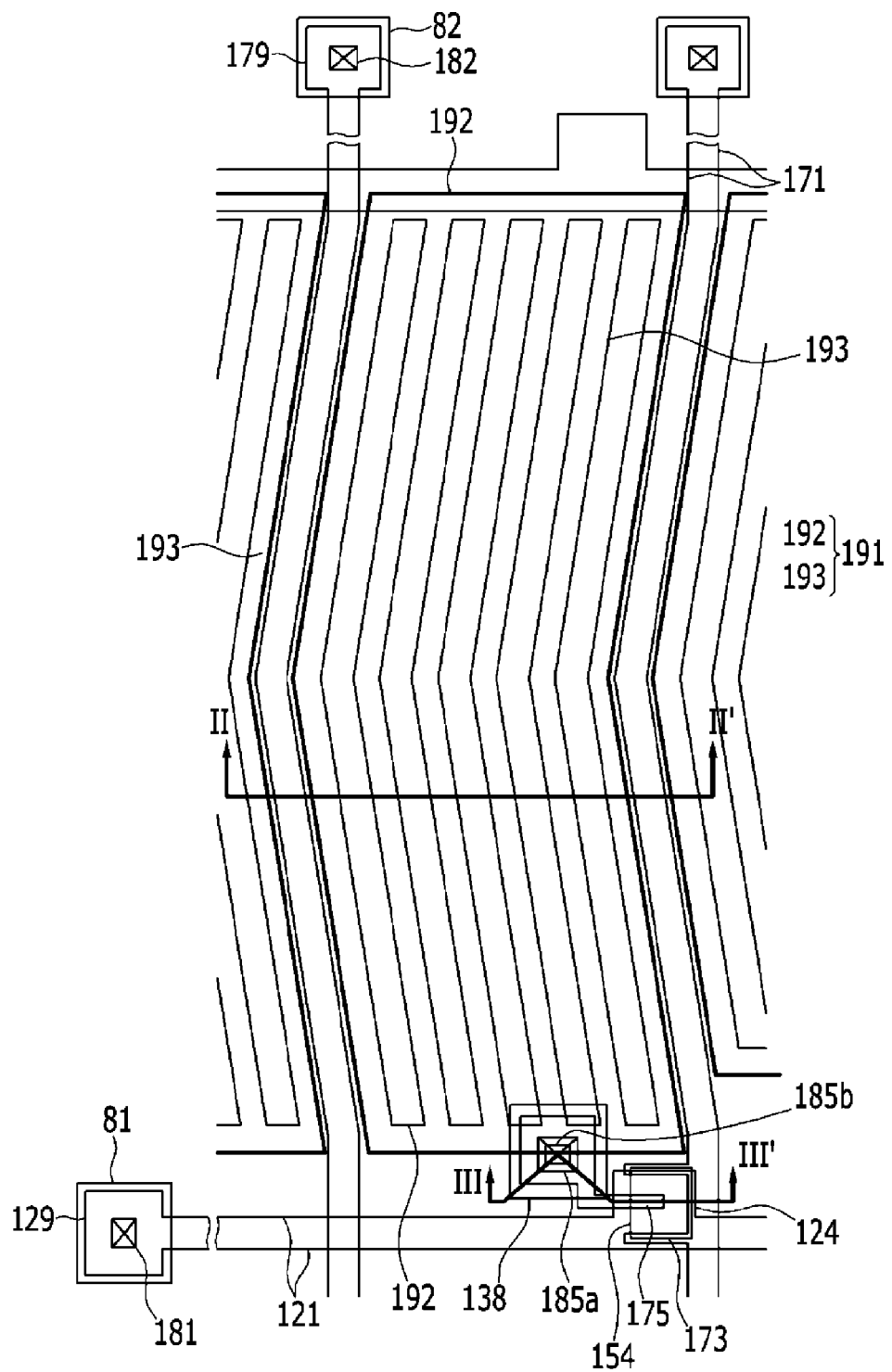
FIG. 1 is a layout view of a display device according to exemplary embodiments of the present invention.

A display device and a method of manufacturing a display device are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, and regions are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a display device according to exemplary embodiments of the present invention will be described in detail with reference to FIGS. 1 to 3.

Figure 2:
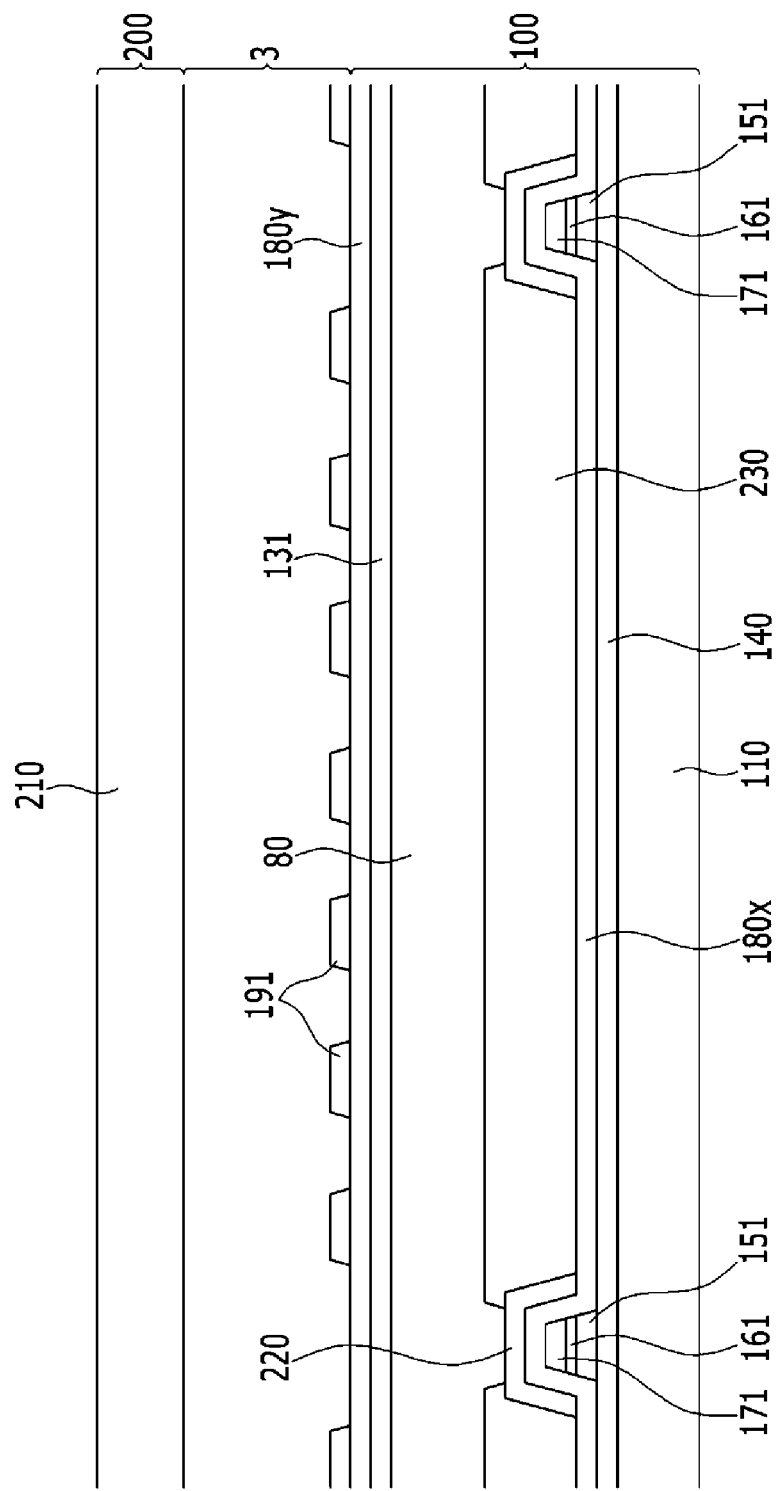
FIG. 2 is a cross-sectional view illustrating the display device of FIG. 1 taken along line II-II'.
Figure 3:
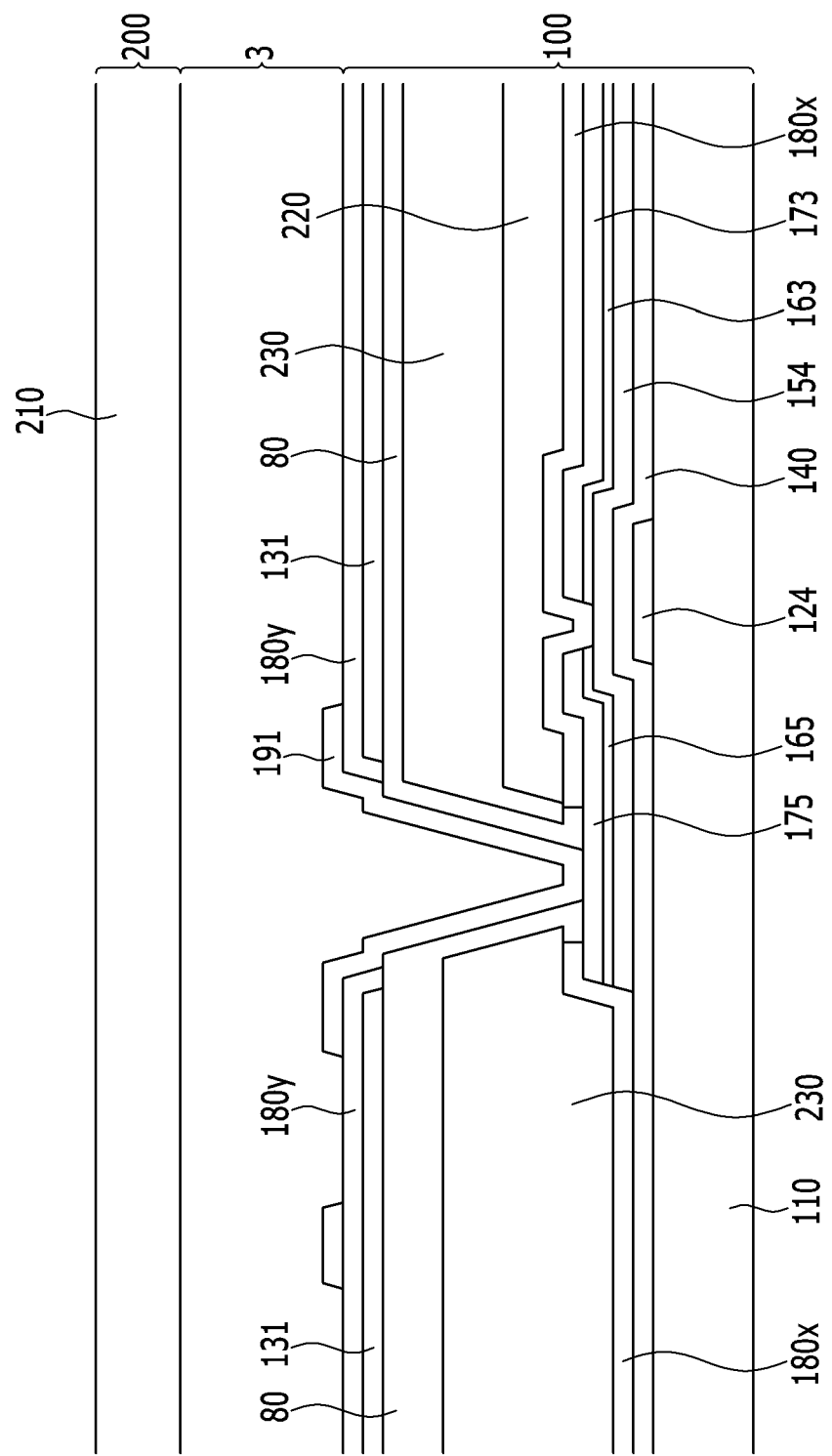
FIG. 3 is a cross-sectional view illustrating a thin film transistor display panel of FIG. 1 taken along line III-III'.

Referring to FIGS. 1 to 3, a plurality of gate lines 121 may be formed on a first insulation substrate 110.

Each gate line 121 may include a wide gate pad portion 129 for a connection with a layer different from that of a plurality of gate electrodes 124 protruding downwardly, or an external driving circuit. The gate driving circuit (not illustrated) generating a gate signal may be mounted on a flexible printed circuit film (not illustrated) attached onto the first insulation substrate 110, or may be directly mounted on the first insulation substrate 110.

The gate line 121 may be a single layer, or a multilayer including two or more conductive layers.

A gate insulation layer 140 may be formed on the gate lines 121. The gate insulation layer 140 may be formed of an inorganic insulator, such as a silicon nitride (SiNx) or a silicon oxide (SiOx).

A plurality of semiconductors 151 may be formed on the gate insulation layer 140. The semiconductor 151 may include a protrusion 154 expanded toward the gate electrode 124. The semiconductor 151 may be amorphous silicon, polysilicon, or an oxide semiconductor.

However, in a case of the liquid crystal display according to exemplary embodiments of the present invention, the semiconductor 151 may also be disposed only on the gate electrode 124.

The semiconductor 151 may include an end portion 159 positioned under the data pad portion 179.

A plurality of ohmic contacts 161, 163, 165, and 169 may be formed on the semiconductors 151. The ohmic contacts 163 and 165 may form a pair facing each other based on the gate electrode 124 to be disposed on the protrusion 154 of the semiconductor 151. The ohmic contact 169 may be positioned under the data pad portion 179.

The ohmic contacts 161, 163, 165, and 169 may be formed of a material, such as n+ hydrogenated amorphous silicon, on which n-type impurity, such as phosphorous, is doped with high concentration, or silicide. However, in a case of a liquid crystal display according to exemplary embodiments of the present invention, the ohmic contacts 161, 163, 165, and 169 may be omitted. For example, in a case where the semiconductor 151 is an oxide semiconductor, the ohmic contacts 161, 163, 165, and 169 may be omitted.

Data conductors including a plurality of data lines 171 and a plurality of drain electrodes 175 may be formed on the ohmic contacts 161, 163, 165, and 169.

The data line 171 transmits a data signal, and is mainly extended in a vertical direction to cross the gate line 121. Each data line 171 may include a wide data pad portion 179 for a connection with a layer different from that of a plurality of source electrodes 173 extending toward the gate electrode 124, or an external driving circuit. The data driving circuit (not illustrated) generating a data signal may be mounted on a flexible printed circuit film (not illustrated) attached onto the first insulation substrate 110, or may be directly mounted on the first insulation substrate 110.

The data line 171 may be periodically bent, and may form an oblique angle with respect to an extended direction of the gate line 121. The oblique angle of the data line 171 with respect to the extended direction of the gate line 121 may be 45 degrees or more. However, in a case of a thin film transistor display panel according to exemplary embodiments of the present invention, the data line 171 may be extended in a straight line.

The drain electrode 175 may include a rod-shaped end portion facing the source electrode 173 based on the gate electrode 124, and the other wide end portion.

The data conductors 171 and 175 may be a single layer, or a multilayer including two or more conductive layers.

The gate electrode 124, the source electrode 173, and the drain electrode 175 form a thin film transistor (TFT), which is a switching element, together with the protrusion 154 of the semiconductor. The semiconductor 151 may have almost the same plane form as those of the data lines 171, the drain electrodes 175, and the ohmic contacts 161, 165, and 169 under the data lines 171 and the drain electrodes 175, except for the protrusion 154 of the semiconductor 151 on which the thin film transistor is positioned.

A first passivation layer 180x may be formed on the data lines 171, the drain electrodes 175, and the protrusions 154 of the exposed semiconductors 151. The first passivation layer 180x may be formed of an inorganic insulator, such as silicon nitride (SiNx) or silicon oxide (SiOx).

The first passivation layer 180x may include a first contact opening, and an organic insulation layer 80 and the pixel electrode 191 are in contact with the drain electrode 175 at the first contact opening.

The first contact opening may be etched by using a color filter 230 or a light blocking member 220 as a mask, and is formed to be wider than an opening of the color filter 230 or the light blocking member 220. That is, an undercut is formed between the first contact opening and the color filter 230 or the light blocking member 220.

Next, the color filter 230 is positioned on the first passivation layer 180x. The color filter 230 may uniquely display one of the primary colors, and an example of the primary colors is the three primary colors, such as red, green, and blue, or yellow, cyan, and magenta. Although it is not illustrated, the color filter may further include a color filter displaying a combination color of the primary colors, or white, other than the primary colors.

An overcoat (not illustrate) may be positioned on the color filter 230, or may be omitted. The overcoat may prevent pigment of the color filter 230 from flowing in the liquid crystal layer 3.

The organic insulation layer 80 may be positioned on the color filter 230. A surface of the organic insulation layer 80 may be generally flat. The organic insulation layer 80 may include a photosensitive material and a non-photosensitive material.

Further, the organic insulation layer 80 may include a plurality of contact openings for the purpose that the gate pad portion 129, the data pad portion 179, and the drain electrode are in contact with each other through the plurality of contact openings. That is, the organic insulation layer 80 is removed at regions corresponding to the gate pad portion 129 and the data pad portion 179. In the process, the organic insulation layer 80 is applied onto the gate pad portion 129 and the data pad portion 179, but is etched in order to form the contact hole.

Further, the contact hole of the organic insulation layer 80 is formed so as to expose a region, in which a second contact opening for physically and electrically connecting the drain electrode 175 and the pixel electrode 191 to be described below is to be formed. The organic insulation layer 80 is generally applied and is etched in the region in which the second contact opening is formed.

A common electrode 131 is formed on the organic insulation layer 80. The common electrode 131 may be formed of a transparent conductive material, such as ITO or IZO. The common electrode 131 in the present exemplary embodiment may be a plate shape, that is, a plane shape.

An edge of the common electrode 131, that is, an opening 138, may correspond to the contact opening of the etched organic insulation layer 80 or be positioned at an inner side of the contact opening of the etched organic insulation layer 80. In this example, an edge of the organic insulation layer 80 may correspond to the edge of the common electrode 131 or protrude compared to the edge of the common electrode 131.

The common electrode 131 is connected with the common voltage line positioned in a peripheral region of a display region to receive the common voltage.

Further, the common electrode 131 has an opening formed in a region corresponding to the drain electrode 175.

A second passivation layer 180y is formed on a part of the common electrode 131 and the organic insulation layer 80. The second passivation layer 180y may be formed of an inorganic insulator, such as silicon nitride (SiNx) or silicon oxide (SiOx).

The second passivation layer 180y may include the second contact opening. The pixel electrode to be described below is electrically contact with the drain electrode through the second contact opening and the contact hole of the organic insulation layer.

The pixel electrode 191 may be formed on the second passivation layer 180y. The pixel electrode 191 may be formed of a transparent conductive material, such as ITO or IZO.

The pixel electrode 191 may include a plurality of branch electrodes 193 generally extended in parallel to each other and spaced apart from each other, and lower and upper horizontal portions 192 connecting upper and lower end portions of the branch electrodes 193. The branch electrodes 193 of the pixel electrode 191 may be bent along the data lines 171. However, in a case of a thin film transistor display panel according to exemplary embodiments of the present invention, the data line 171 and the branch electrode 193 of the pixel electrode 191 may be extended in a straight line.

In a case of the lower substrate according to exemplary embodiments, the plane common electrode 131 may be disposed under the second passivation layer 180y, and the pixel electrode 191 having the branch portions may be disposed on the second passivation layer 180y, but in a case of a lower substrate according to exemplary embodiments, the pixel electrode 191 having the branch portions may be disposed under the second passivation layer 180y, and the plane common electrode 131 may be disposed on the second passivation layer 180y. Further, any one of the common electrode 131 and the pixel electrode 191 may include a branch electrode, and the other one may have a plane. Further, any one of the common electrode 131 and the pixel electrode 191 may receive the common voltage, and the other one may receive the data voltage.

A contact opening through which a part of the gate pad portion 129 is exposed is formed on the first passivation layer 180x, the second passivation layer 180y, and the gate insulation layer 140. The number of contact openings may be one or more, and a plane shape of the contact opening may be a polygon, such as a quadrangle, or a circle or an ellipse. For example, a connecting member may be formed at the contact opening.

Further, a contact opening through which a part of the drain electrode 175 is exposed is formed in the first passivation layer 180x and the second passivation layer 180y. The contact opening will be described. The contact opening of the first passivation layer 180x is larger than the contact hole of the adjacent organic insulation layer 80, and the contact opening of the second passivation layer 180y is larger than the contact hole of the organic insulation layer 80.

The liquid crystal layer 3 is positioned between the lower substrate 100 including the first insulation substrate 110 and the upper substrate 200 including the second insulation substrate 210.

The liquid crystal layer 3 may include a nematic liquid crystal material having positive dielectric anisotropy. The liquid crystal molecules of the liquid crystal layer 3 are arranged so that a direction of elongated axes of the liquid crystal molecules is in parallel to the substrates 110 and 210, and have a structure in which the direction is spirally deviated by 90° from a rubbing direction of an alignment layer of the first insulating substrate 110 to the second insulating substrate 210.

The common electrode 131 and the pixel electrode 191 receiving the common voltage and the data voltage generate an electric field on the liquid crystal layer 3.

A display device according to exemplary embodiments of the present invention will be described with reference to FIGS. 4 and 5. Hereinafter, only a different configuration from the aforementioned configuration will be described.

Figure 4:
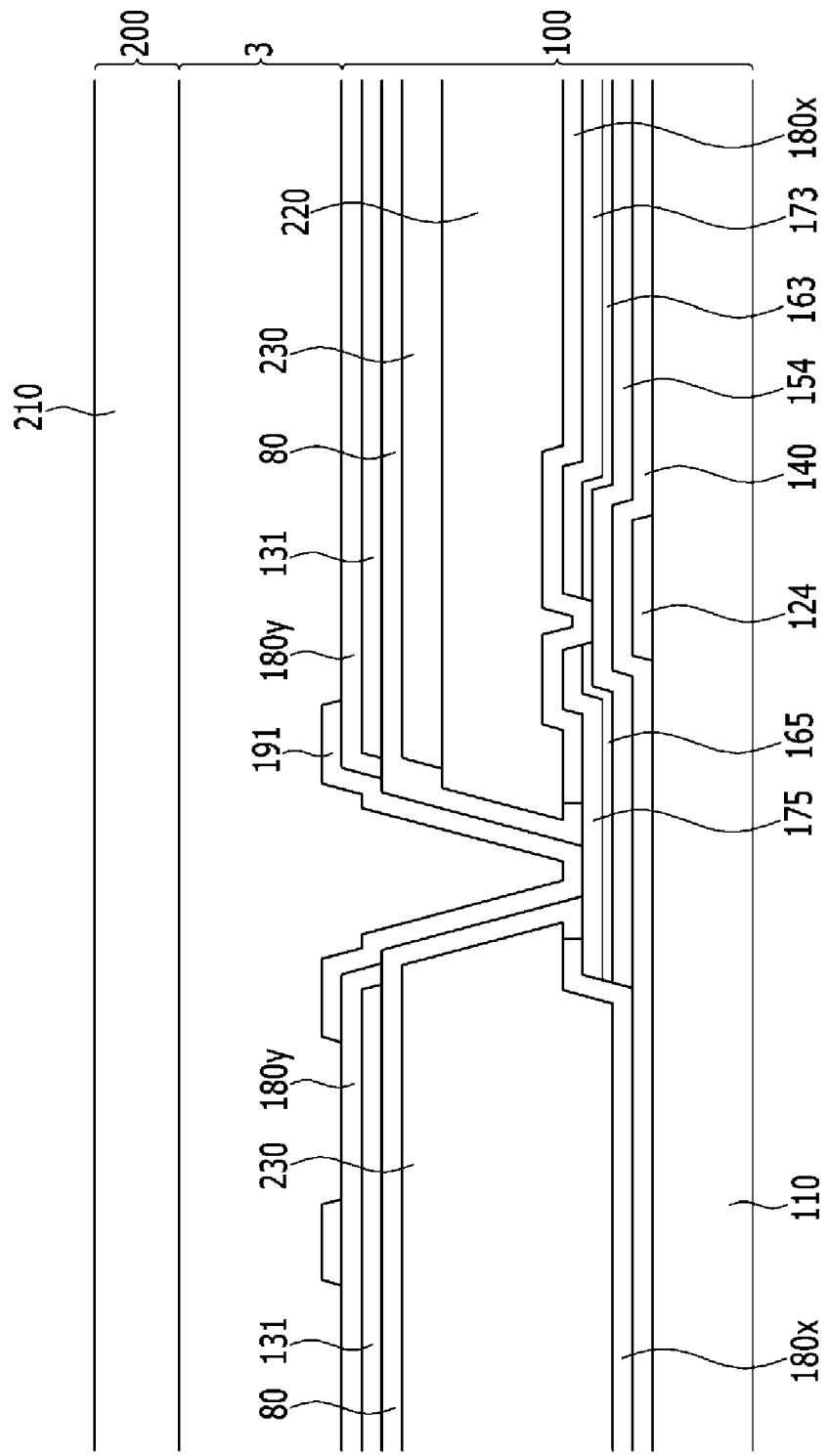
FIGS. 4 to 5 are cross-sectional views of a display device according to exemplary embodiments of the present invention.
Figure 5:
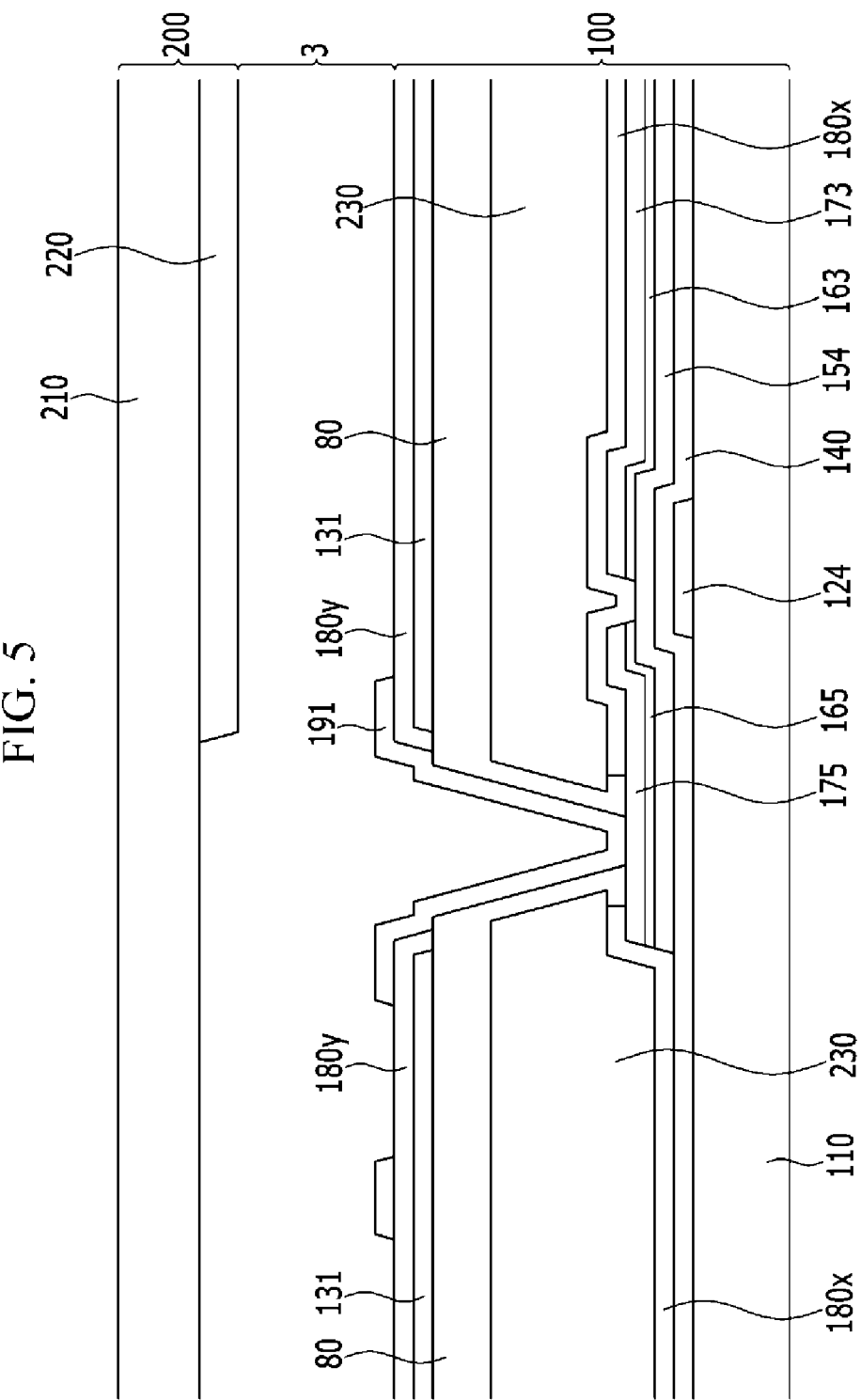

First, referring to FIG. 4, compared to the exemplary embodiment of the present invention illustrated in the FIG. 3, a light blocking member 220 may be positioned on a first passivation layer 180x. Further, a color filter 230 may be positioned on the light blocking member 220.

According to an exemplary embodiment, the color filter 230 may be positioned and the light blocking member 220 may be positioned on the color filter 230, but in another exemplary embodiment, the light blocking member 220 may be positioned, and the color filter 230 may be positioned on the light blocking member 220. As described above, the positions of the color filter 230 and the light blocking member 220 differ from those of other exemplary embodiments of the present invention, but the forming of a first contact opening of a first passivation layer 180x by using the color filter 230 or the light blocking member 220 as a mask may be the same as those of other exemplary embodiments of the present invention.

Next, exemplary embodiments of the present invention will be described with reference to FIG. 5. According to exemplary embodiments illustrated in FIG. 5, a display device may include a light blocking member 220 positioned on a second insulating substrate 210 facing a first insulating substrate 110. In an exemplary embodiment of the present invention, the light blocking member 220 may be positioned on the lower substrate on which the first insulating substrate 110 is positioned, but according to another exemplary embodiment of the present invention, the light blocking member 220 may be positioned on an upper substrate on which the second insulating substrate 210 is positioned.

In this case, the display device may have a structure in which a color filter 230 is positioned on the first insulating substrate 110, and the light blocking member 220 is positioned on the second insulating substrate 210. Accordingly, a first contact opening of a first passivation layer 180x is formed by using the color filter 230 as a mask.

However, the present invention is not limited thereto. Exemplary embodiments of the present invention may have a structure in which the color filter 230 is positioned on an upper substrate, and the light blocking member 220 is positioned on a lower substrate as a matter of course.

Then, a manufacturing method of the lower substrate 100 including the first insulating substrate according to the exemplary embodiments of the present invention will be described with reference to FIGS. 6 to 16. FIGS. 6 to 15 are cross-sectional views illustrating a manufacturing method of the lower substrate according to the exemplary embodiments of the present invention.

Figure 6:
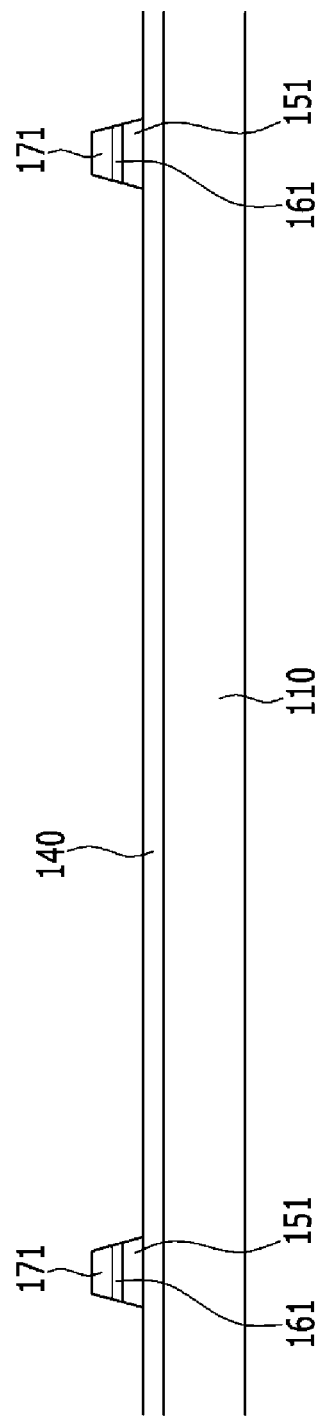
FIGS. 6 to 16 are cross-sectional views illustrating a manufacturing method of the display device according to exemplary embodiments of the present invention.
Figure 7:
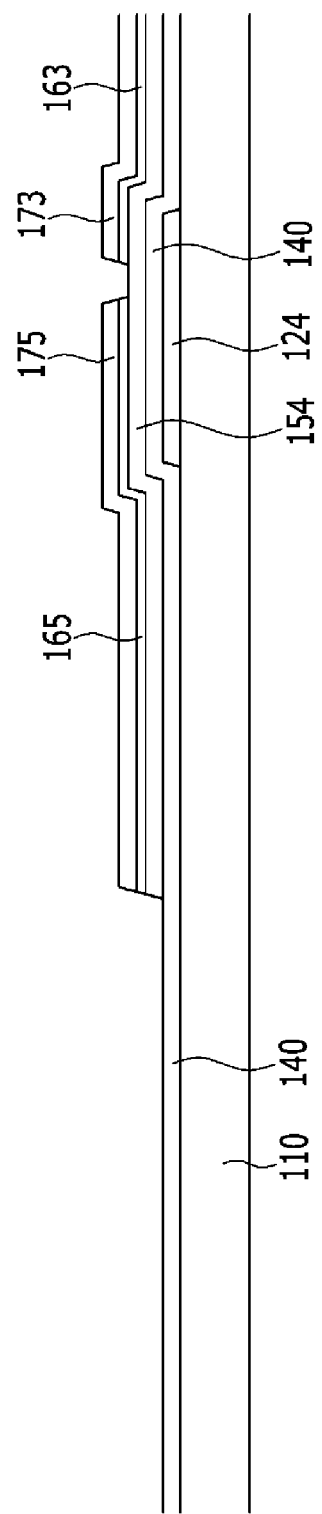

In some examples, as illustrated in FIGS. 6 and 7, the gate line 121 including the gate electrode 124 and the gate pad portion 129 is formed on the first insulating substrate 110. In this case, the common voltage line disposed in a peripheral region may be simultaneously formed. Then, the gate insulation layer 140 is stacked on the gate line 121 and the common voltage line, the semiconductor 151 is stacked on the gate insulation layer 140, and a layer serving as the ohmic contact is formed. The data line 171 including the source electrode 173 and the data pad portion 179, and the data conductor including the drain electrode 175 are formed. Then, the layer forming the ohmic contact is etched by using the data conductor as a mask to complete the ohmic contacts 161, 163, 165, and 169, and a part of the protrusion 154 of the semiconductor 151 is exposed. The gate insulation layer 140 may be formed of an inorganic insulator, such as silicon nitride (SiNx) or silicon oxide (SiOx).

Figure 8:
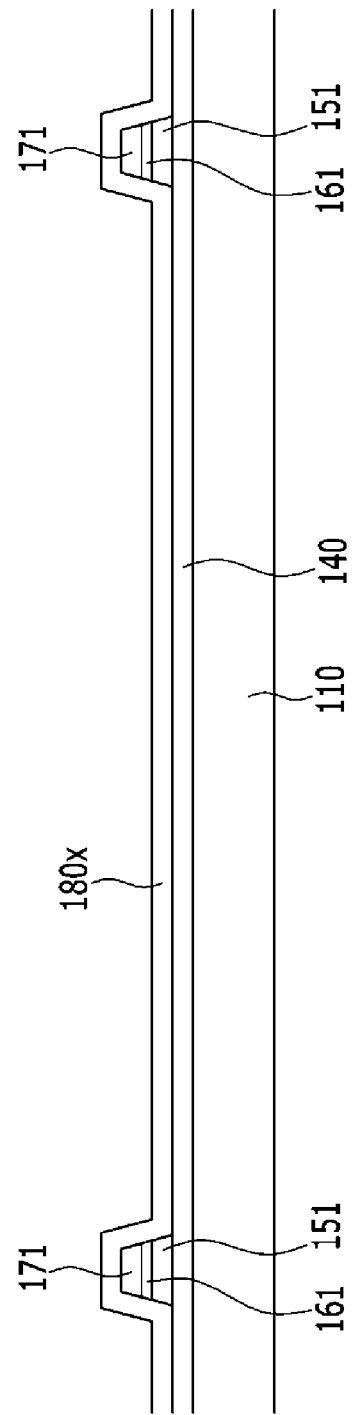
Figure 9:
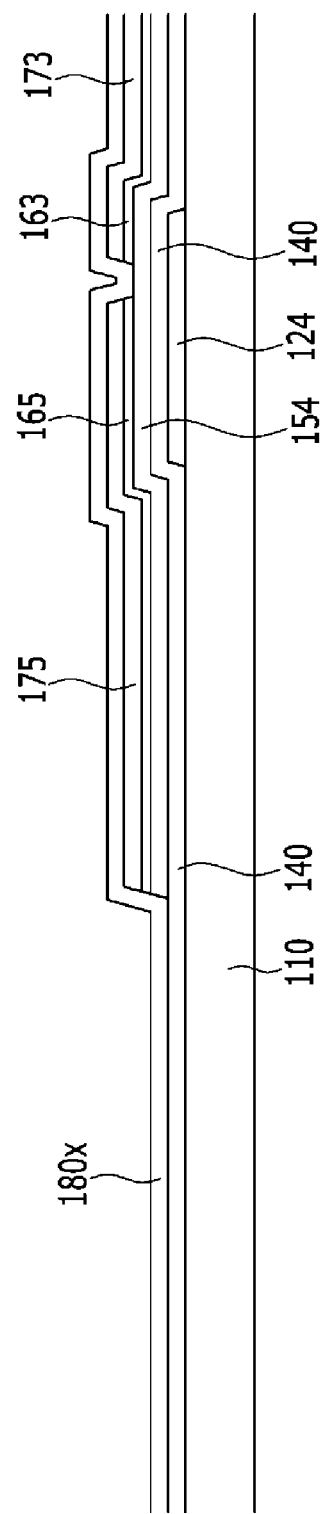

Next, referring to FIGS. 8 and 9, the first passivation layer 180x is stacked on the data conductors 171 and 175. The first passivation layer 180x may be formed of an inorganic insulator, such as silicon nitride (SiNx) or silicon oxide (SiOx).

Figure 10:
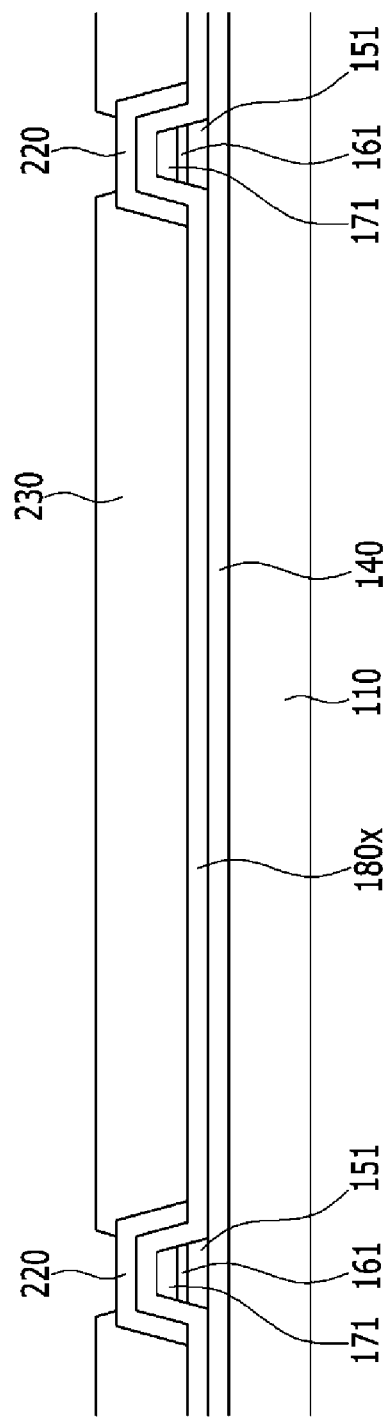
Figure 11:
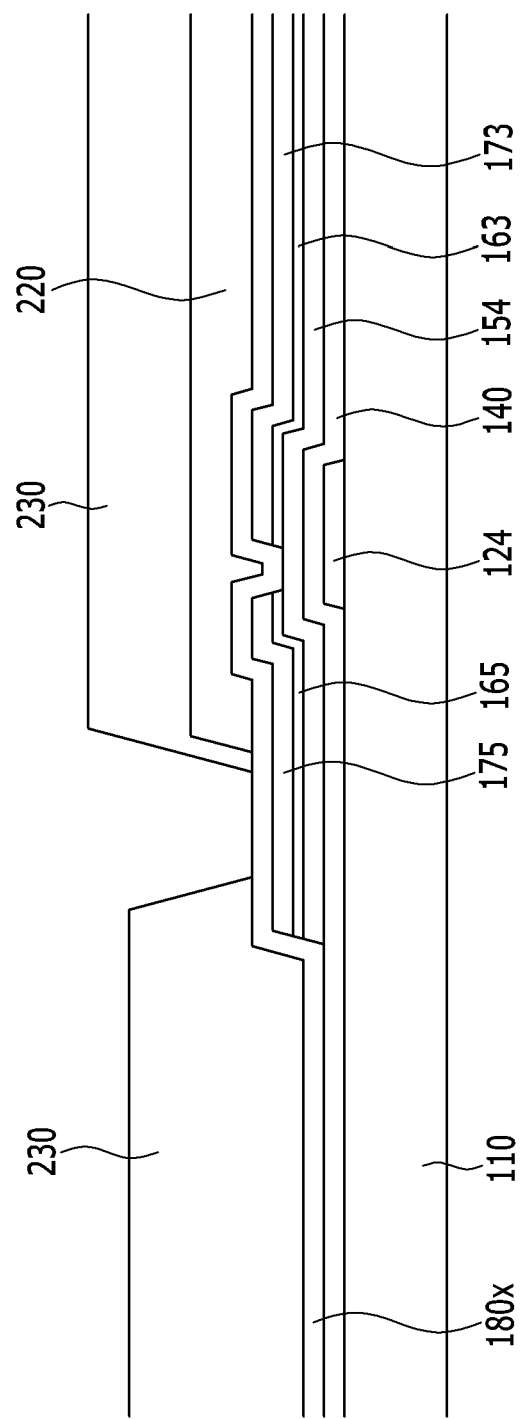

Next, referring to FIG. 10 to FIG. 11, the light blocking member 220 or the color filter 230 is stacked on the first passivation layer 180x. The color filter 230 and the light blocking member 220 are removed in a region corresponding to a peripheral area of the drain electrode 175, and the removed region is referred to as an opening.

Figure 12:
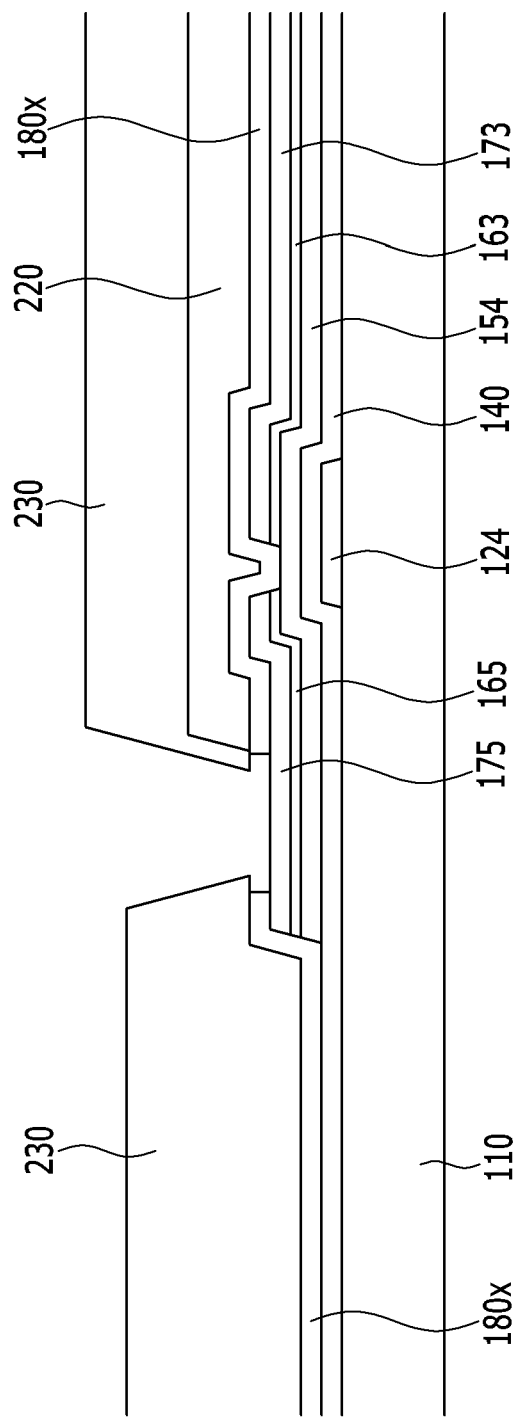

Next, referring to FIG. 12, the first passivation layer 180x is etched by using the color filter 230 as a mask at the opening. In this case, any method of etching the first passivation layer 180x, but, for example, dry etching may be used.

According to the aforementioned etching, the first contact opening of the first passivation layer 180x is formed by using the opening of the color filter 230 as a mask. In this case, an undercut is generated in the first passivation layer 180x by the etching, so that the first contact opening is formed to be larger than the opening.

Figure 13:
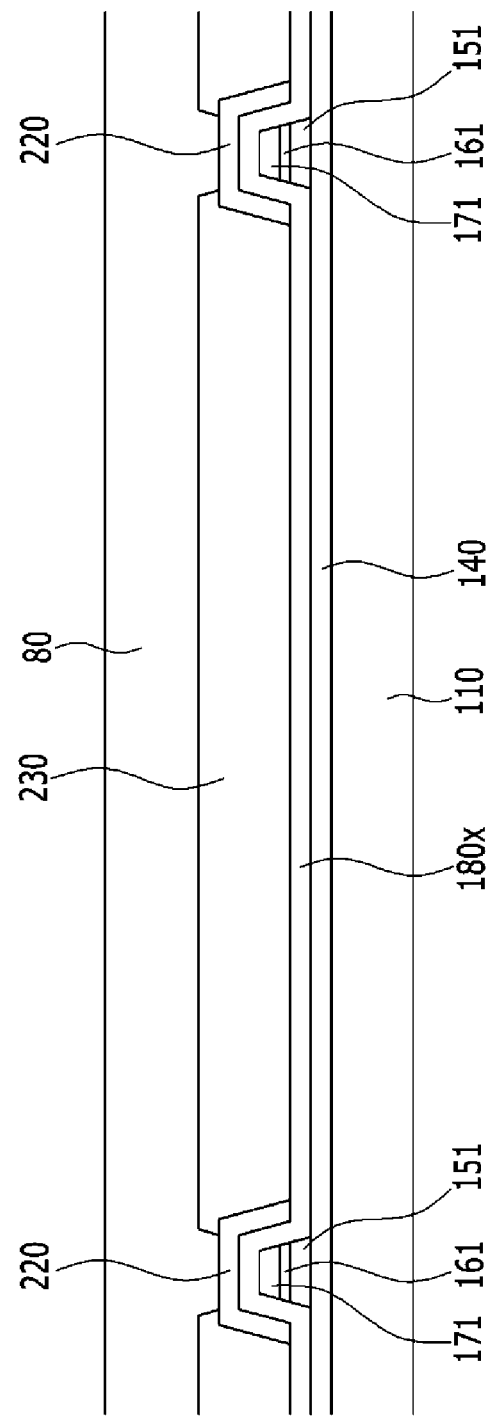
Figure 14:
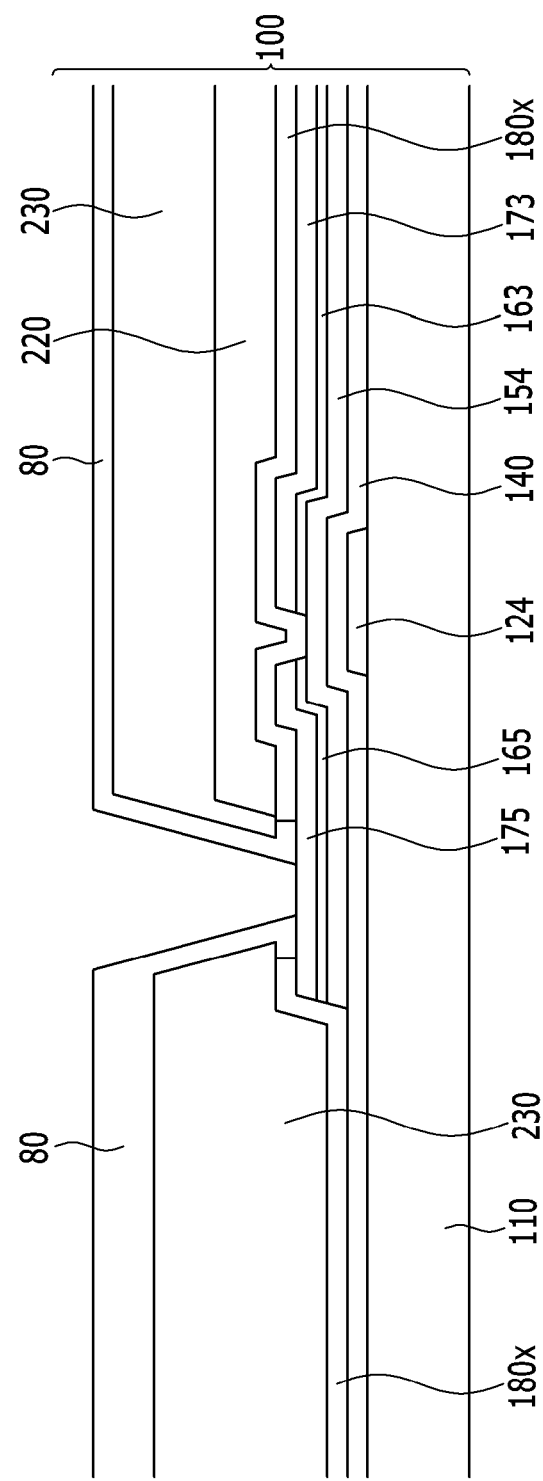

Next, referring to FIGS. 13 and 14, the organic insulation layer 80 may be formed on the color filter 230 or the light blocking member 220. The organic insulation layer may include a photosensitive material and a non-photosensitive material, and a surface of the organic insulation layer may be generally flat. The organic insulation layer may also positioned in regions corresponding to the gate pad portion 129 and the data pad portion 179.

The organic insulation layer formed at this time covers the undercut region as illustrated in FIG. 14, and particularly, covers the opening of the color filter 230 and the first contact opening of the first passivation layer 180x. A disconnection of the display device may be prevented by the covering by the organic insulation layer.

Figure 15:
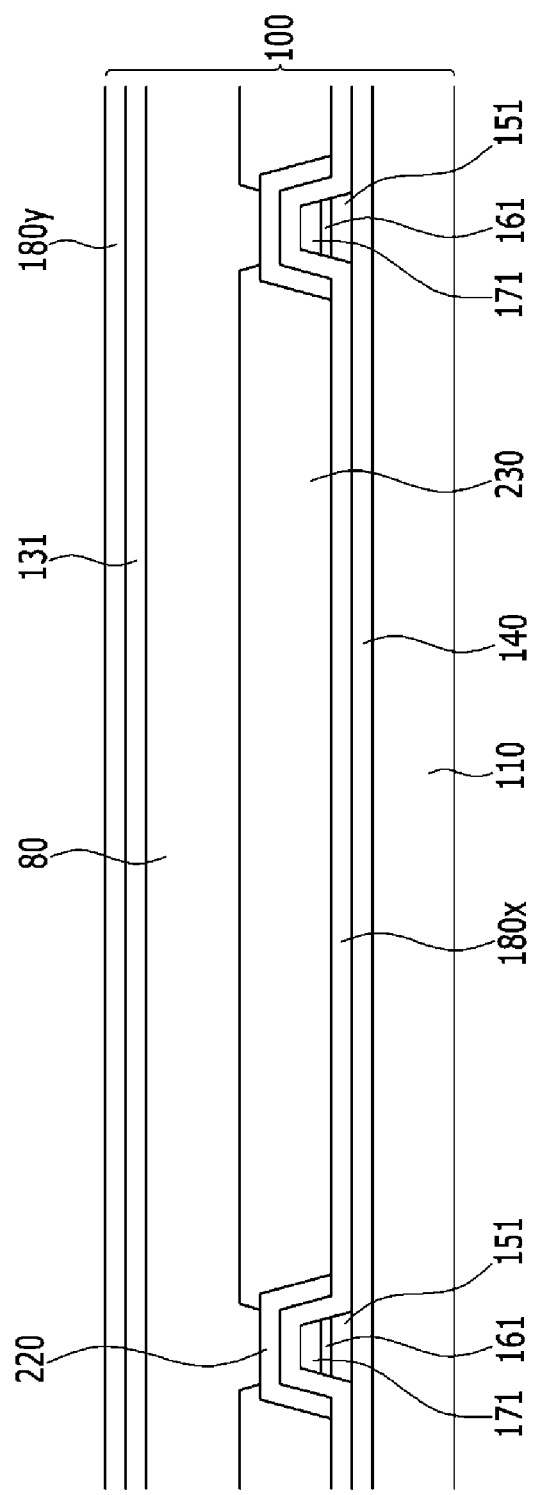
Figure 16:
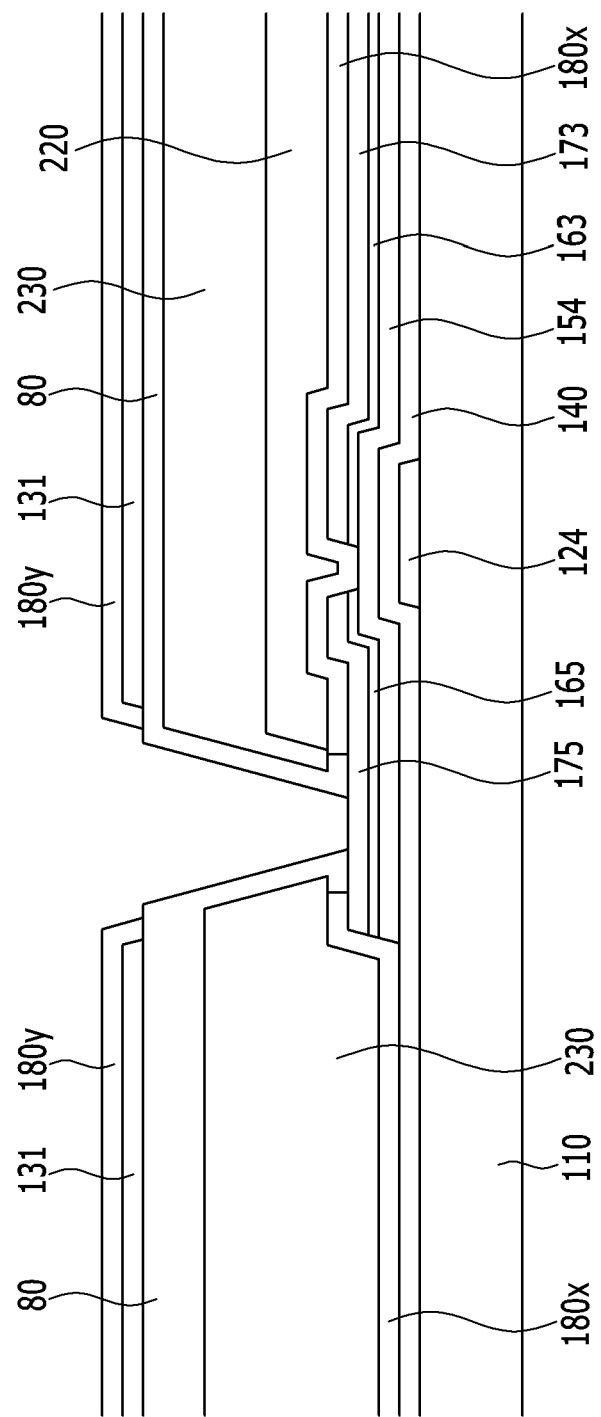

Next, referring to FIGS. 15 and 16, the common electrode 131 including the contact opening corresponding to a position corresponding to the drain electrode 175 is formed by stacking a conductive layer on the organic insulation layer. As an example of the present invention, the common electrode 131 may be a plane shape.

The common electrode 131 is formed by forming a photosensitive film pattern (not illustrated) on the conductive layer, and then etching the conductive layer applied on the organic insulation layer by using the photosensitive film pattern as a mask. A thickness of the photosensitive film pattern formed at this time may be equal to or larger than a thickness of the organic insulation layer.

The second passivation layer 180y is formed on the common electrode 131. In this case, as illustrated in FIG. 3, the contact opening 181 through which a part of the gate pad portion 129 is exposed, the contact opening 182 through which a part of the data pad portion 179 is exposed, and a second contact opening through which a part of the drain electrode 175 is exposed are formed by etching the second passivation layer 180y. In this case, the second contact opening of the second passivation layer 180y may be larger than the contact hole of the organic insulation layer 80.

As illustrated in FIGS. 1 to 3, the pixel electrode 191, the first connecting member 81, the second connecting member 82, and the third connecting member 86 are formed on the second passivation layer 180y.

The first connecting member 81 covers the gate pad portion 129 exposed through the contact opening 181, and the second connecting member 82 covers the data pad portion 179 exposed through the contact opening 182.

The pixel electrode 191 covers the drain electrode 175 exposed through the second contact opening, to be physically and electrically connected with the drain electrode 175.

Figure 17:
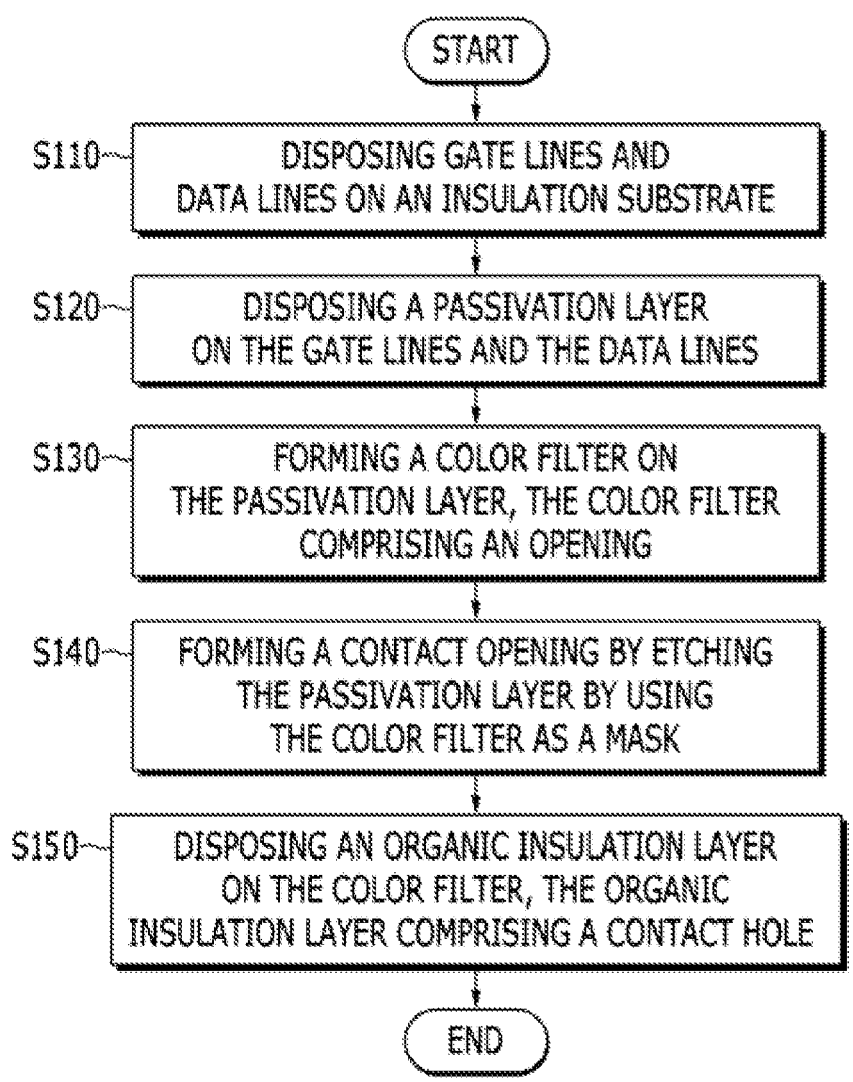
FIG. 17 is a flowchart of a process for illustrating of manufacturing the display device according to exemplary embodiments of the present invention.

FIG. 17 is a flowchart of a process for illustrating of manufacturing the display device according to exemplary embodiments of the present invention.

In step 110, gate lines and data lines are disposed on a substrate. In step 120, a passivation layer is disposed on the gate lines and the data lines. In step, 130, a color filter is formed on the passivation layer. The color filter may include an opening. In step 140, a contact opening is formed by etching the passivation layer by using the color filter as a mask. In step 150, an organic insulation layer is disposed on the color filter. The organic insulation layer may include a contact hole. The contact hole of the organic insulation layer is smaller than a contact hole of the passivation layer.

All of the characteristics of the display device according to the exemplary embodiments of the present invention may be applied to all of the cases in which both a common electrode and a pixel electrode, which are two electric field generating electrodes, are positioned on a lower substrate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a substrate;
    a thin film transistor disposed on the substrate;
    a passivation layer disposed on the thin film transistor and comprising a first contact opening;
    a color filter disposed on the passivation layer and comprising an opening overlapping a part of the thin film transistor; and
    an organic insulation layer disposed on the color filter and comprising a contact hole; and
    a light blocking member disposed below or above the color filter,
    wherein:
    the organic insulation layer directly contacts an interior surface of the opening and the first contact opening; and
    the contact hole of the organic insulation layer is smaller than the opening of the color filter, and the opening of the color filter is smaller than the first contact opening of the passivation layer.

2. The display device of claim 1, further comprising:
    a common electrode disposed on the organic insulation layer;
    a second passivation layer comprising a second contact opening and disposed on the common electrode; and
    a pixel electrode disposed on the second passivation layer,
    wherein the second contact opening is larger than the contact hole.

3. The display device of claim 1, wherein an undercut is positioned between the first contact opening and the opening.

4. The display device of claim 1, wherein the thin film transistor is connected to a gate line and a data line disposed on the substrate.

5. The display device of claim 2, wherein the pixel electrode comprises a plurality of cutouts, and the common electrode comprises a plane shape.

6. The display device of claim 1, further comprising:
    a second substrate facing the first substrate; and
    a light blocking member disposed on the second substrate.

7. The display device of claim 1, wherein the organic insulation layer is at least partially disposed in the first contact opening.

8. The display device of claim 1, further comprising a drain electrode disposed on the substrate,
    wherein:
    the first contact opening exposes a first portion of the drain electrode;
    the opening in the passivation layer exposes a second portion of the drain electrode; and
    the second portion is smaller than the first portion.

* * * * *